(12) United States Patent
Johnson et al.

(10) Patent No.: US 6,412,173 B1
(45) Date of Patent: Jul. 2, 2002

(54) MINIATURE TURBOMOLECULAR PUMP (75) Inventors: Mark C. Johnson, Phoenix; Michael R. McNamee, Mesa; Jason L. Addink, Phoenix, all of AZ (US)

(73) Assignee: Phoenix Analysis and Design Technologies, Inc., Gilbert, AZ (US)

( * ) Notice: Subject to any disclaimer, the term of this patent is extended or adjusted under 35 U.S.C. 154(b) by 0 days.

(21) Appl. No.: 09/626,299

(22) Filed: Jul. 25, 2000

Related U.S. Application Data (60) Provisional application No. 60/145,236, filed on Jul. 26, 1996.

(51) Int. Cl.⁷ .................................................. B23P 15/00
(52) U.S. Cl. .................................... 29/889.23; 29/889.7
(58) Field of Search ........................ 29/889.23, 889.7, 29/888.025, 888.024, 888.02; 416/219 R, 215; 415/90

(56) References Cited

U.S. PATENT DOCUMENTS

| | | | |
|---|---|---|---|
| 3,623,826 A | * 11/1971 | Mandell et al. | 29/889.23 |
| 4,111,595 A | 9/1978 | Becker et al. | 415/90 |
| 4,309,143 A | * 1/1982 | Klatt et al. | 29/889.23 |
| 4,541,772 A | 9/1985 | Becker | 415/90 |
| 4,717,315 A | 1/1988 | Miki et al. | 417/365 |
| 4,806,075 A | 2/1989 | Osterstrom et al. | 415/175 |
| 5,152,679 A | 10/1992 | Kanemitsu et al. | 417/423.4 |
| 5,188,514 A | * 2/1993 | Inserra et al. | 416/223 A |
| 5,542,825 A | 8/1996 | Perrillat-Amede et al. | 417/423.4 |
| 5,688,106 A | 11/1997 | Cerruti et al. | 415/90 |
| 5,924,841 A | 7/1999 | Okamrua et al. | 415/90 |
| 6,050,782 A | 4/2000 | Lembke | 417/205 |
| 6,062,810 A | 5/2000 | Miyamoto et al. | 415/90 |

FOREIGN PATENT DOCUMENTS

FI WO 95/26845 * 10/1995

* cited by examiner

*Primary Examiner*—Charles G. Freay
*Assistant Examiner*—Michael K. Gray
(74) *Attorney, Agent, or Firm*—James L. Farmer (57) ABSTRACT

The present invention provides a very compact, lightweight, turbomolecular pump for evacuating a chamber at volumetric flowrates of less than 10 liters per second. In one embodiment a turbomolecular pump is provided having a bladed rotor disposed within a housing, and mounted for rotation at one end on a passive magnetic main bearing and at the other end on a ball bearing. The pump is configured such that the magnetic bearing carries a majority of the rotor unbalance load. The rotor may be beneficially tapered from a larger diameter at the high vacuum end to a smaller diameter at the low vacuum end. The invention also provides a method of machining the blades of the rotor from a rotor blank using a single point tool in a two-step numerical control lathe operation. In another method of the invention, the rotor blades are individually cut using a high speed circular slitting saw by plunging the saw radially into the rotor blank.

11 Claims, 6 Drawing Sheets

MINIATURE TURBOMOLECULAR PUMP

RELATED APPLICATION

This application is based on priority under 35 U.S.C. 119(e) of U.S. provisional patent application serial No. 60/145,236, filed Jul. 26, 1996, the entire content of which is incorporated by reference herein.

TECHNICAL FIELD

The present invention generally relates to vacuum pumps, and more particularly, to pumps known as turbomolecular pumps characterized by "bladed" rotor and stator construction with running clearances in the millimeter range which are particularly effective in the free molecular flow range. More specifically, this invention is directed to a novel rotor design and bearing system useful in vacuum pumps of the single-ended type in which the rotor is supported by bearings at either end in a so-called "straddle-mount" arrangement.

BACKGROUND OF THE INVENTION

High rotational velocity vacuum pumps are used today in many high vacuum applications, where a high vacuum of best quality is required, as well as when a relatively large amount of gas is intended to be pumped away. Typically turbomolecular pumps are used in combination with a higher pressure "roughing pump" in a series arrangement, where the turbomolecular pump is connected to the volume to be evacuated at one of its ends and at its other end to the roughing pump. Turbomolecular pumps utilizing a rotor with multilple rows of blades operate according to the principle that fast moving solid surfaces transfer a linear momentum to substances in gas phase which come in their path. Turbomolecular pumps can in this manner impart a velocity to gas molecules and thereby direct gas molecules out from a volume to be evacuated.

A drag stage is commonly incorporated into modern turbomolecular pumps downstream of the bladed rotor portion. Drag stages normally operate at higher pressures by means of friction against a rotating wall forcing gas particles into an arrangement of helical grooves in an adjacent static member. Different types of pumps or stages can also be combined in several steps to give a higher compression. Common for all of these types is that they demand extremely fast rotating parts.

In most turbo molecular pumps, the pressure ratio varies exponentially with the rotational speed of the rotating parts, and the pumping speed varies linearly. Therefore it is highly advantageous to be able to operate at as high of rotational speed as possible. However, higher rotational speeds translate into higher rotor unbalance loads which must be carried by the bearings, and thus the bearings become critical from an operational design standpoint.

Manufacturers have traditionally used mechanical ball bearings and the like to support the rotor because of their reliability and relatively low cost. However, mechanical bearings have certain inherent deficiencies which limit their use in high speed turbomolecular pumps. For example, ball bearings inherently consume power as a result of friction induced by the balls orbiting around the axis at very high angular velocity, causing substantial contact forces between the balls and raceway. Also, power consumption can increase dramatically when increased radial or axial loads are imparted to the bearings from rotor unbalance or from operation at harmonic modes of the system. The internal contact forces in ball bearings also inherently cause wear of the bearing parts and heat generation, both of which are exacerbated by rotor unbalance. Therefore precise balancing of the rotor and alignment of the bearings becomes paramount when using ball bearings.

High vacuum pump manufacturers have progressed from solely using mechanical bearings, to using different types of magnetic bearings, sometimes in combination with mechanical bearings. Generally, so called active magnet bearings, i.e. electronically regulated electro-magnet bearings, are used. Occasionally, so called passive bearings, where the force usually is generated by repulsion between appropriately magnetized permanent magnets, are used. In designs where a pair of magnetic bearings is used to support the rotor, an additional axial stabilizing feature is required, such as a ball bearing or a pair of opposed jewler's bearings, or alternatively a regulated axial electro-magnet. A disadvantage of this type of design is that the rotor is inherently unstable despite the use of eddy current damping, usually necessitating additional external damping means to prevent large rotor excursions and blade rubbing. Alternatively the rotor may be supported radially by one permanent magnet bearing and one mechanical bearing such as a ball bearing, in which case the mechanical bearing may also provide stability to the rotor. In such designs, additional external damping devices may not be necessary. The advantage with passive systems in general is the lack of complex regulating systems associated with the electromagnet bearings and a lower price.

Turbomolecular pumps have seen wide use in both the semiconductor and medical industries. Generally speaking for these applications the size and weight of the vacuum pumping equipment has not been a significant design factor. The smallest and lightest turbomolecular pumps currently available are in the range of 5 pounds in weight, and in a size range of 4 inches in diameter by 6 inches in length. Also, power consumption has generally not been a driving factor determining the design of prior art pumps.

However, for certain new applications, such state of the art turbomolecular pumps are not satisfactory. For example, turbomolecular pumps are desired for certain space-based applications in which greatly reduced weight, size, power draw, and complexity are all critical. A suitable turbomolecular pump for such applications preferably would weigh less than ½ pound, and draw less than 7 Watts power while pumping a chamber to typical high vacuum levels. Regulated electro-magnet type designs are unsuitable because of problems associated with scaling down the internal regulating systems, and the overall complexity of such systems. Existing systems that use mechanical bearings, or mechanical bearings in combination with passive magnetic bearings, fail because of the high relative power consumption of the mechanical bearing, or because of the need for additional external dampers with a two passive bearing system.

Thus, a need exists for a simple, efficient, compact, and lightweight turbomolecular pump.

SUMMARY OF THE INVENTION

In one embodiment of the invention, a turbomolecular pump is provided comprising a housing having an intake for connecting to a chamber to be evacuated, and an exhaust for exhausting to lower vacuum. A rotor is disposed within the housing having a high vacuum end exposed to the intake, a low vacuum end, and a plurality of rows of rotor blades disposed about an outer periphery thereof. A non-contacting type main bearing is provided for rotatably supporting the rotor substantially at the high vacuum end; and a contacting type bearing rotatably supports the rotor substantially at the low vacuum end. Preferably the non-contacting bearing is a passive magnetic bearing, and the contacting type bearing is a ball bearing. The pump may be configured wherein the non-contacting bearing is substantially axially nearer the rotor's axial center of gravity than the contacting bearing. The noncontacting main bearing is exposed to the high vacuum of the intake. An emergency main bearing is provided for supporting the inlet end of the rotor in the event of large rotor excursions.

In accordance with the present invention a serpentine gas flowpath is defined. An annular pumping section defining a first gas flowpath axially extends in a forward-to-aft direction from an inlet end in fluid communication with volume being evacuated, to a pumping section outlet end. An annular drag stage defines a second gas flowpath axially extending in an aft-to-forward direction from an inlet end in fluid communication with the pumping section outlet end, to a drag stage outlet end. A third gas flow path extends axially in a forward-to-aft direction from an inlet in fluid communication with the drag stage outlet end, to an exhaust port.

In another embodiment of the invention, a method of machining the rotor blades of a high speed vacuum pump rotor is provided, comprising the following steps: An axisymmetric rotor blank having an outer surface is provided. A plurality of closely spaced helical grooves are machined in the outer surface of the rotor blank extending along a desired pitch angle, the walls of the helical grooves defining the working surfaces of the rotor blades. A plurality of adjacent annular grooves are machined in the outer surface, intersecting the helical grooves, whereby the annular grooves separate the rotor blades into distinct rows and define the leading and trailing edges of the rotor blades. Preferably the steps of machining the helical grooves and machining the annular grooves are performed in a numerical control lathe operation, using a single point cutting tool for each step.

In still another embodiment of the invention a method is provided for machining the rotor blades of a high speed vacuum pump rotor, comprising the following steps: An axisymmetric rotor blank is provided and a plurality of adjacent annular grooves are machined in the outer surface. A plurality of angled regularly spaced slits are cut into the rotor blank material between annular grooves, the slits defining the working surfaces of the rotor blades, and the annular grooves separating the rotor blades into distinct rows. The slits may be formed by plunging a high speed rotary saw blade radially into the rotor blank to the depth of a rotor blade.

BRIEF DESCRIPTION OF THE DRAWING FIGURES

The present invention will hereinafter be described in conjunction with the appended drawing figures, wherein like numerals denote like elements, and.

DETAILED DESCRIPTION OF THE PREFERRED EMBODIMENT

A turbomolecular pump according to embodiments of the present invention will be described below with reference to the drawing figures. Although the subject invention is described herein in conjunction with the appended drawing figures, it will be appreciated that the scope of the invention is defined entirely by the claims, and not limited to the specific embodiments shown and described. One skilled in the art will recognize that various modifications in the selection and arrangement of parts, components, and processing steps may be made without departing from the spirit and scope of the invention as set forth in the appended claims.

Figures 1, 1A:
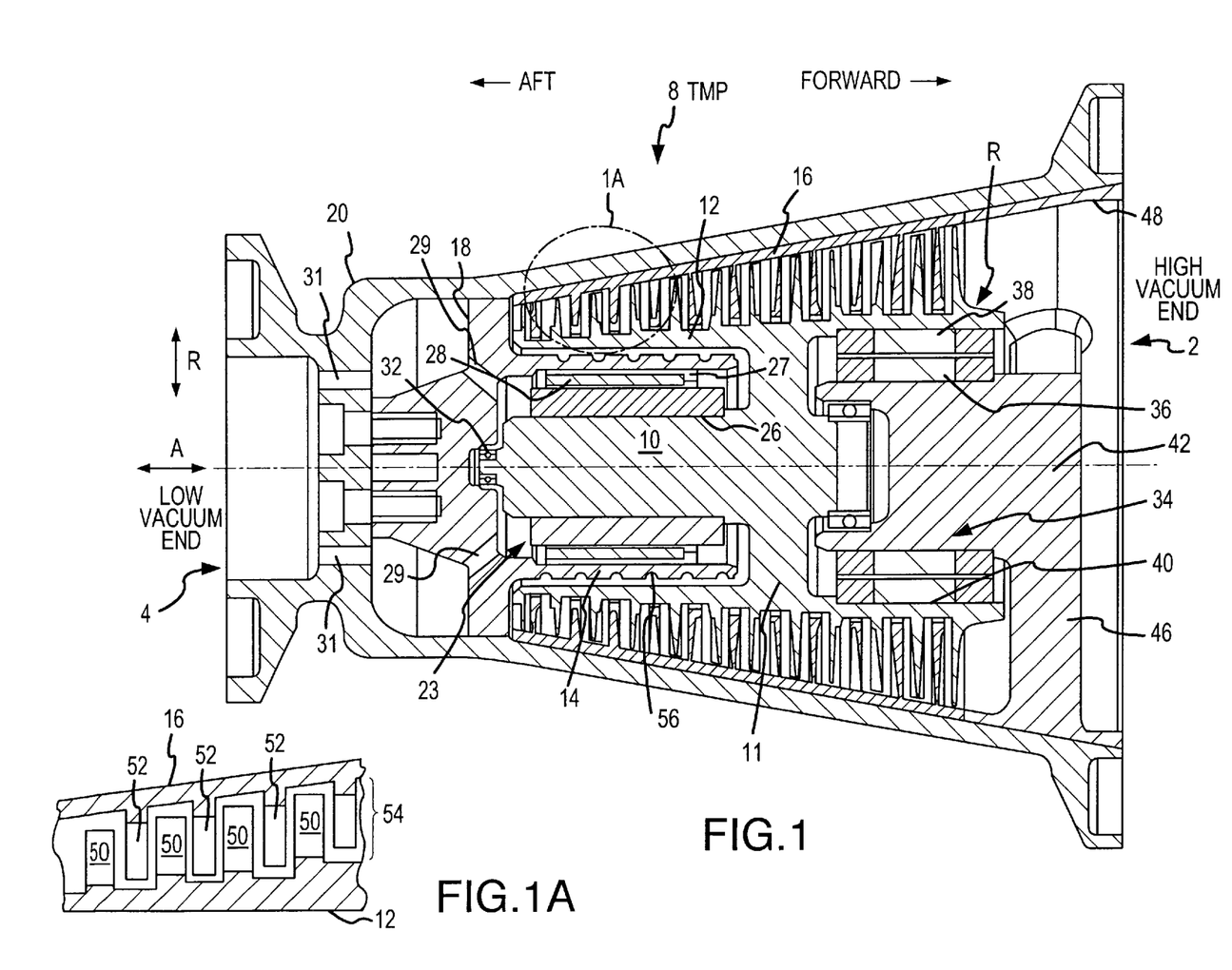
FIG. 1 is a cross-sectional view of an exemplary turbomolecular pump embodying the present invention.
FIG. 1A is an enlarged view of a portion of FIG. 1.
Figure 2:
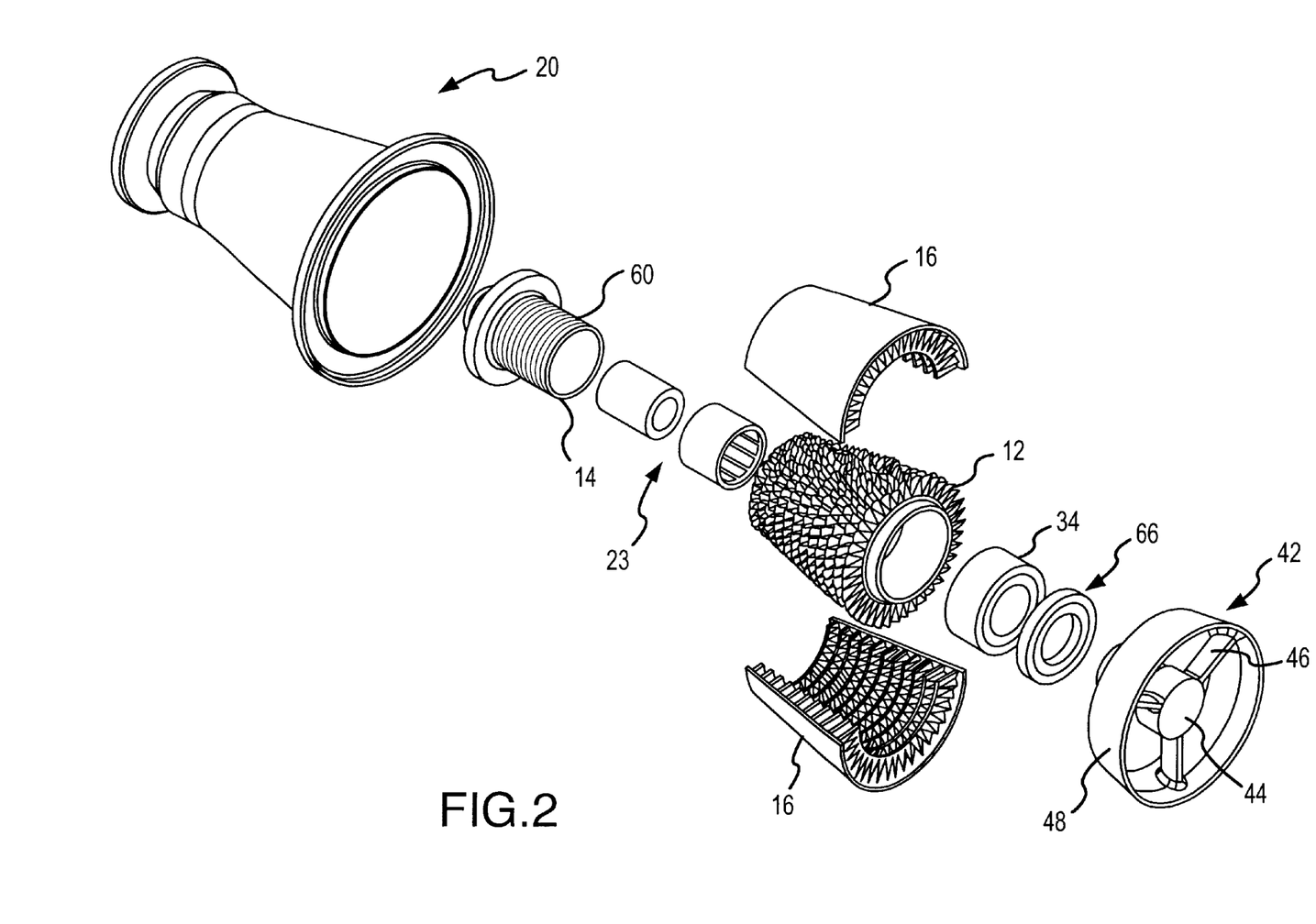
FIG. 2 is an exploded perspective view of the turbomolecular pump embodiment shown in FIG. 1.

As shown in FIG. 1, a turbomolecular pump 8 according to a preferred embodiment of the present invention has a high vacuum end 2 for connecting to a chamber to be evacuated (not shown) and a low vacuum end 4 which typically exhausts to roughing pump (not shown). Where convenient the high vacuum and low vacuum ends will also be referred to herein as the front and rear ends or the forward and aft ends respectively. It should be also noted that radial and axial directions referred to herein correspond to the directions indicated by arrows R and A respectively in FIG. 1. The turbomolecular pump 8 comprises a rotor 6 having a main shaft 10, a cylindrical or tapered rotating bladed section 12 in surrounding concentric relation to shaft 10, and a radial web 11 which connects shaft 10 and bladed section 12 and causes integral rotation of the rotating bladed section 12 with the main shaft 10. A rear frame 18 is rigidly mounted inside an outer housing 20 at the aft end of the turbomolecular pump 8, and has a static cylindrical drag member 14 which surrounds the main shaft 10. A stator shroud 16 is fixedly disposed inside of housing 20 in surrounding relation to the rotating cylindrical section 12 of rotor 6. As shown in FIG. 2, the shroud 16 may be formed in two separate halves to allow for assembly with rotor 6 and housing 20. Rotor blades 50 are integrally provided on the outer circumferential surface of the rotating bladed section 12, and stationary vanes 52 which alternate with the rotating blades 50 are provided on the inner circumferential surface of the shroud 16 (as best viewed in FIG. 1A). A blade pumping section 54 which evacuates gas by the interaction of the blades 50 rotating at a high speed, and in cooperation with the stationary vanes 52 is thus formed.

A drive motor 23 for rotating the rotor 6 at high speeds is provided between the main shaft 10 and the cylindrical drag member 14. The motor 23 includes a rotating permanent magnet sleeve 26 fixed to shaft 10, preferably by means of a mechanical interference fit, and windings 28 surrounded by a fixed permanent magnet 27 rigidly mounted to an inner bore of the drag member 14 of rear frame 18. At the aft end of the main shaft 10 there is provided a mechanical ball bearing 32. The outer race of ball bearing 32 is press fit into a mating cavity in rear frame 18. It will be appreciated that other types of mechanical bearings with suitable mechanical properties and capabilities may be utilized as well for bearing 32.

The forward end of rotor 12 is supported by a passive magnetic bearing 34 comprised of a stationary permanent magnet inner sleeve 36 and a rotating permanent magnet outer sleeve 38. The outer sleeve 38 is preferably press fit into an inner bore 40 of bladed section 12, and the inner sleeve 36 is mounted to a static front frame 42. Although sleeves 36, 38 are depicted in FIG. 1 as one continuous piece, it may be preferable to construct each sleeve using a plurality of stacked together ring sections instead. An example of such a stacked bearing arrangement is disclosed in U.S. Pat. No. 5,152,679 by Kanemitsu, the relevant portions of which are incorporated herein by reference.

At the forward end of shaft 10 is an emergency main bearing 64. Preferably bearing 64 is a dry-lubricated ball bearing to minimize contamination of the gas flow. The clearances in bearing 64 are set up such that in normal use it does not carry any load. However, upon failure of the magnetic bearing 34, or large transient excursion of the shaft 10, emergency bearing 64 will engage and prevent damaging contact from occurring between the rotating and static parts of the pump.

The front frame 42, best viewed in FIG. 2, is rigidly mounted inside the housing 20, and includes a bearing mount portion 44, struts 46, and outer frame portion 48. The struts 46 support the bearing mount portion 44, while allowing free flow of gas from the chamber being evacuated into the pump 8. Generally three struts 46 are sufficient, however additional struts may be used without detracting appreciably from the performance of the pump.

Figure 3:
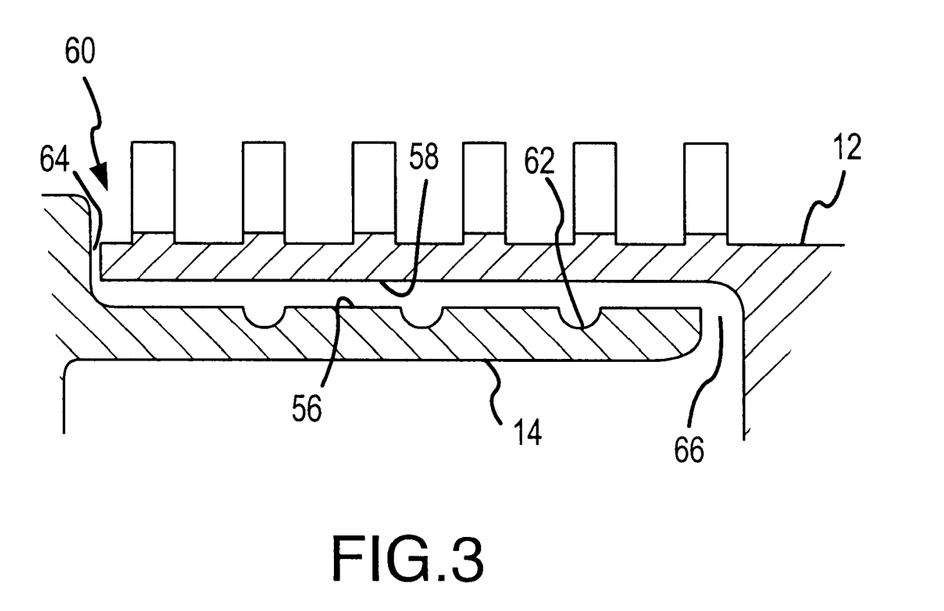
FIG. 3 is a cross-sectional view of a drag stage portion of a turbomolecular pump in accordance with the present invention.

Referring now to FIG. 3, a drag stage 60 is formed between the outer circumferential surface 56 of the static cylindrical drag member 14 and an inner circumferential surface 58 of the bladed section 12 of rotor 6, defining a narrow annular space therebetween. A spiral or helical groove 62 is provided along the outer circumferential surface of the drag member 14. Due to the close proximity of the rotating surface 58 to grooved surface 56, gas entering the drag stage at inlet end 64 is pumped by drag effect along the helical grooves to the outlet end 66.

In operation, gas enters the turbomolecular pump 8 at the high vacuum (forward) end and is pumped by pumping section 54 in forward-to-aft axial direction to the aft end of rotor 6. From there, the gas flow then reverses direction and enters the drag stage 60 at the aft end, where it is then pumped in an axially aft-to-front direction to the forward end of the drag stage 60. Upon exiting the drag stage 60, the gas flow again reverses direction flowing past motor 23 in a forward-to-aft axial direction, and exhausting to the low vacuum end through exhaust ports 29 and 31. Thus a serpentine gas flowpath is defined by the structure of the preferred embodiment pump shown in FIG. 1 in which gas entering the high vacuum end of the pump reverses direction twice before being exhausted at the low vacuum end.

Figure 4:
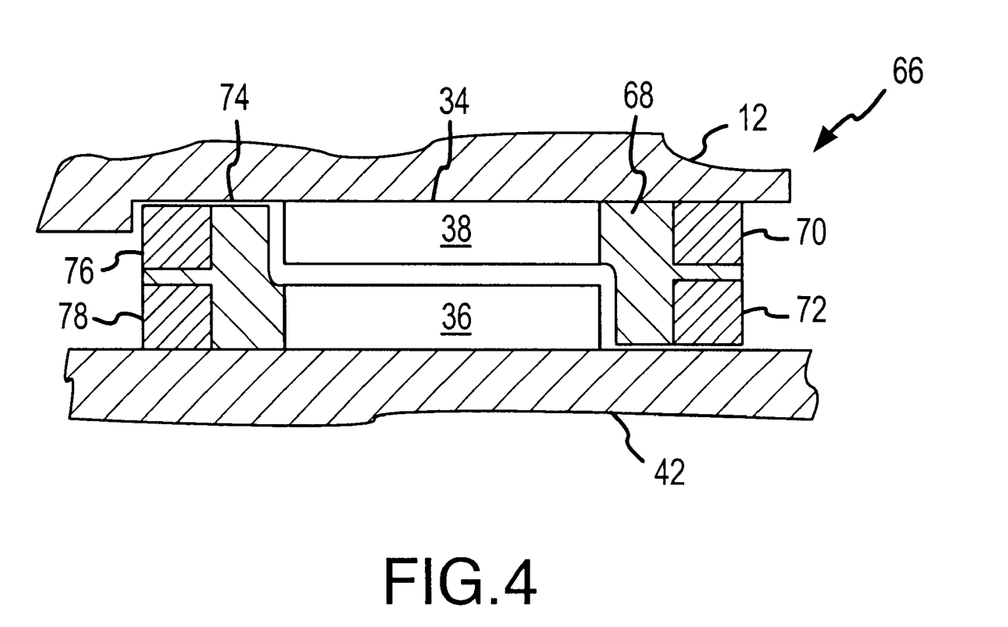
FIG. 4 is a cross-sectional view of a unique eddy current damper system.

The present invention utilizes a unique eddy current type damping system 66, shown in FIG. 4, for maintaining stability of the main magnetic bearing 34. The damping system consists of a rotating copper damper 68 in combination with two rotating magnets 70 and 72 at one end of bearing 34. The damper system may also include a static damper 74 in combination with two static magnets 76 and 78 at the opposite end of bearing 34. Eccentric excursions of the rotating components induce electrical currents in the copper dampers, with resulting forces acting always to center the rotor.

The inventors have discovered in attempting to design turbomolecular pumps of scaled down in size and weight sufficient to satisfy the current needs, that the relative size and relative power consumption of the mechanical bearings increases as the pump size decreases and pump speed increases. The inventors further discovered that an efficient compact design utilizing a mechanical bearing could nevertheless be achieved by incorporating design features that reduce the proportional load carried by the mechanical bearing, and bias the proportional load to the magnetic bearing.

Figure 5:
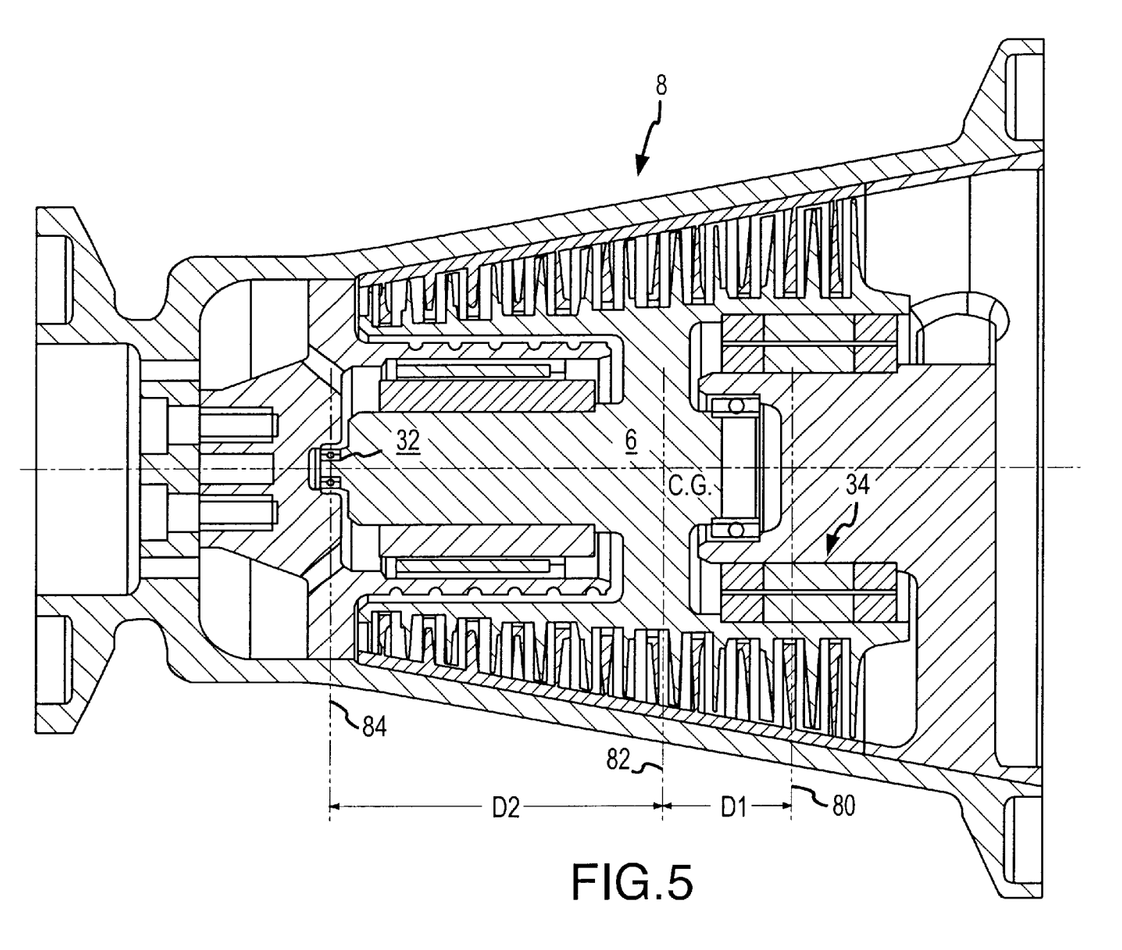
FIG. 5 is a cross-sectional view of a turbomolecular pump embodying the present invention, indicating the location of the rotor bearings relative to the rotor center of gravity.

The loading bias toward the main magnetic bearing 34 may be achieved in part by tailoring the axial placement of the bearings relative to the rotor center of gravity. In a preferred embodiment of the invention the main magnetic bearing 34 is located axially near the center of gravity of the rotor 12, relative to the mechanical bearing 32 which is axially located relatively far from the rotor center of gravity. Referring to FIG. 5, the ratio of the distance D1 (between the centerline 80 of the magnetic bearing 34 and the center of gravity 82 of the rotor 12) to the distance D2 (between the centerline 84 of mechanical bearing 32 and the center of gravity 82 of the rotor 12) is preferably between about 1/3 and 1/1, and most preferably about 1/2.

The desired relative bearing loading may also be achieved by selective geometric positioning of the bearings 32, 34 relative to the rotor 6. For example, as shown in FIGS. 1 or 5, the magnetic bearing 34 is located closer to the geometric center of the rotor 6 than the mechanical bearing 32. In the embodiment shown, the magnetic bearing 34 is axially positioned entirely within the axial span of the rotating bladed section 12 of rotor 6, while the mechanical bearing 32 is axially positioned entirely outside the axial span of bladed section 12. Thus, the rotor unbalance loads will in general be biased to the magnetic bearing. It will be appreciated that either bearing could be shifted further toward the low vacuum end of the pump than the positions shown in the drawing figures to further bias the load toward the magnetic bearing 34.

Figure 6:
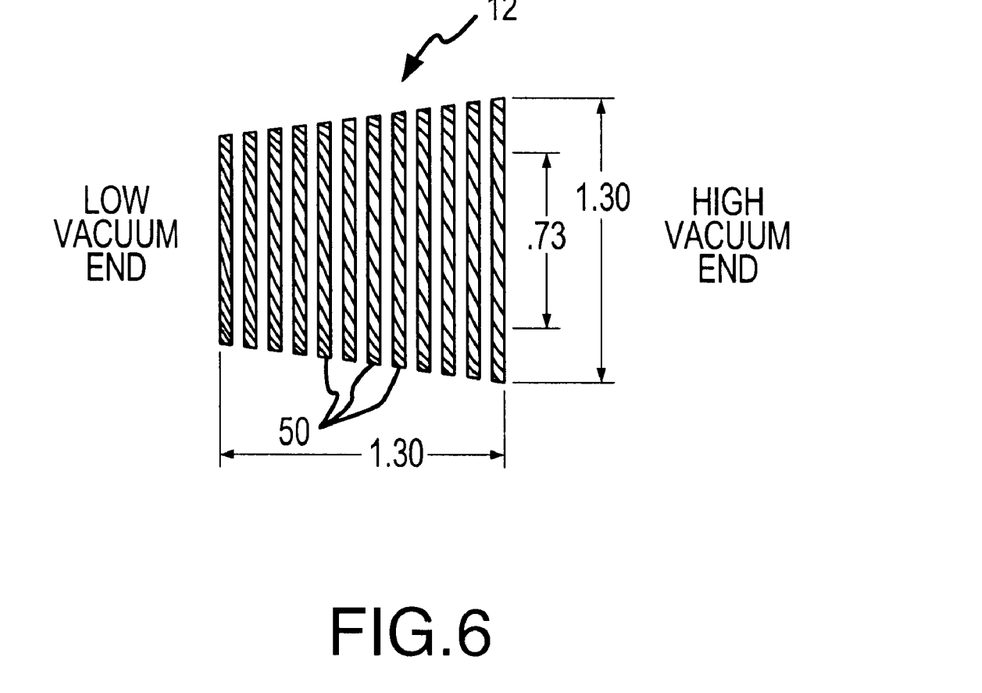
FIG. 6 is a plan view of the bladed portion of the turbomolecular pump rotor.
Figure 6A:
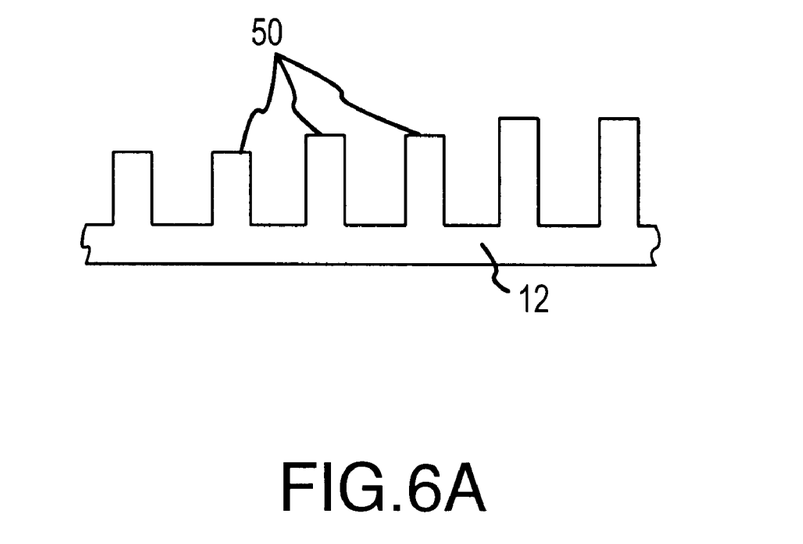
FIG. 6A is an enlarged cross sectional view of a portion of the bladed rotor of FIG. 6.

The rotor 6 of the present invention may be cylindrical, or alternatively tapered so as to form a conical shaped bladed section 12. Referring to the conical shaped rotor of FIG. 6, the diameter of the rotor measured at the tips of blades 50 tapers from the high vacuum end to a smaller diameter at the low vacuum end. In one preferred embodiment of a rotor having a conical rotating section 12 that is 1.3 inches in axial length, the diameter of the rotor measured at the blade tips (DR) tapers from approximately 1.3 inches at the high vacuum end to 0.9 inches at low vacuum end, or a taper of approximately 0.3 inches diameter per inch of axial length. Moreover, the inventors have determined that good results are achievable by using a taper in the range of 0.0 (not tapered), to 0.5 inches of blade tip diameter per inch of rotor axial length. It will be appreciated that the rotor need not necessarily taper smoothly as depicted, but may instead taper in a stepwise manner. For example, as shown in FIG. 6A, the blade rows may taper in pairs whereby the diameter changes after every other blade row rather than every row. The diameter of the bladed section 12 at the root of blades 50 may also taper from the high vacuum end to the low vacuum end, as best seen in FIGS. 1 and 5. In the embodiment shown, the diameter at the blade roots tapers in a stepwise fashion, although a smoother taper or alternative stepwise taper, or even no taper may work equally as well.

By the above described arrangements, a majority of the radial operating loading is carried by the magnetic bearing 34. Consequently, the relative power consumption of the mechanical bearing is greatly reduced over that possible with scaled down conventional turbomolecular pump designs using one or more mechanical bearings. In addition, a tapered design of the rotor provides for a more compact and lighter design. The tapering allows the magnetic bearing to be placed geometrically relatively near the high vacuum end of the rotor while maintaining the desired load bias toward the magnetic bearing, thereby leaving more room for the electric motor 33 and mechanical bearing 32. This results in less overall length of the pump 6, and consequently less weight.

Figure 7:
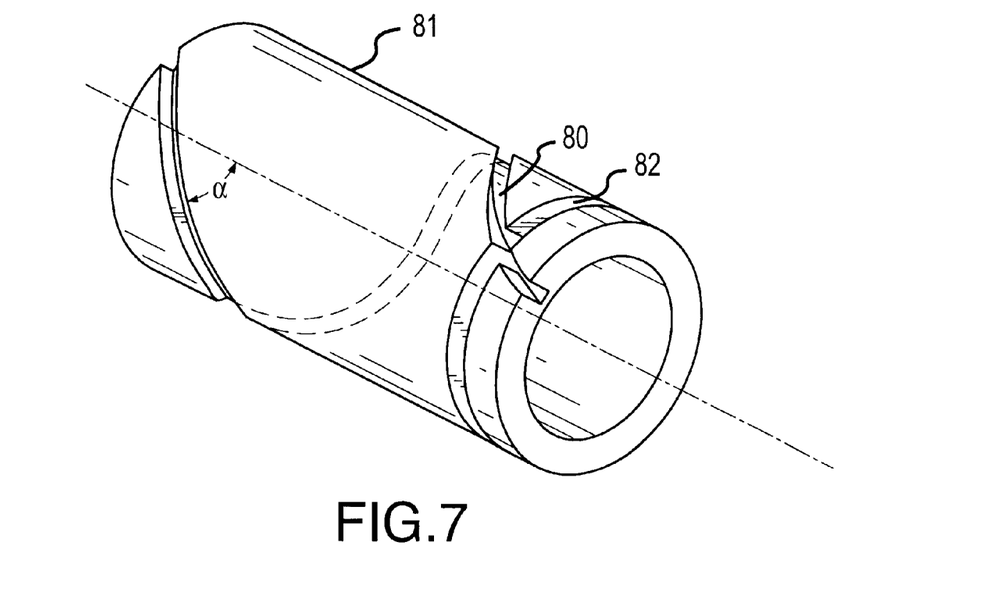
FIG. 7 is a perspective view of a partially machined rotor using a machining method in accordance with the present invention.

The blades 50 of bladed section 12 are preferably manufactured by a unique process that utilizes a single point cutting tool. In this process the blades are integrally machined from an axisymmetric metal rotor blank premachined to an outside diameter, with a taper if desired, matching the desired finished blade tip diameters and taper. Referring now to FIG. 7, a series of helical cuts 80 are made in a rotor blank 81 using the single point tool, the cuts extending axially from end to end of the rotor. The cuts 80 define the working surfaces of the blades 50, and the angle $\alpha$ of the helical cuts to the axial direction defines the pitch angle of the finished blades 50. The angle $\alpha$ may also be varied along the axial length of the rotor as needed to ultimately produce blade rows with different blade angles. After all of the cuts 80 are complete a second single point tool cutting operation is performed in which a series of spaced apart annular channels 82 are formed. The annular channels 82 define the leading and trailing edges of the blades, and also define the annular gaps between blades 50 into which the stator vanes 52 fit. The width and spacing of the annular channels 82 may also be varied as needed.

An advantage of this process is that a single numerical control lathe or similar tooling having spiral or thread cutting capability may be used for the entire operation, resulting in an extremely simple and fast blade machining process. In addition to time savings, large cost savings may be realized over the more typical multi-axis milling operations requiring complex computer controls and perhaps multiple cutting operations to complete the blade rows.

Figure 8:
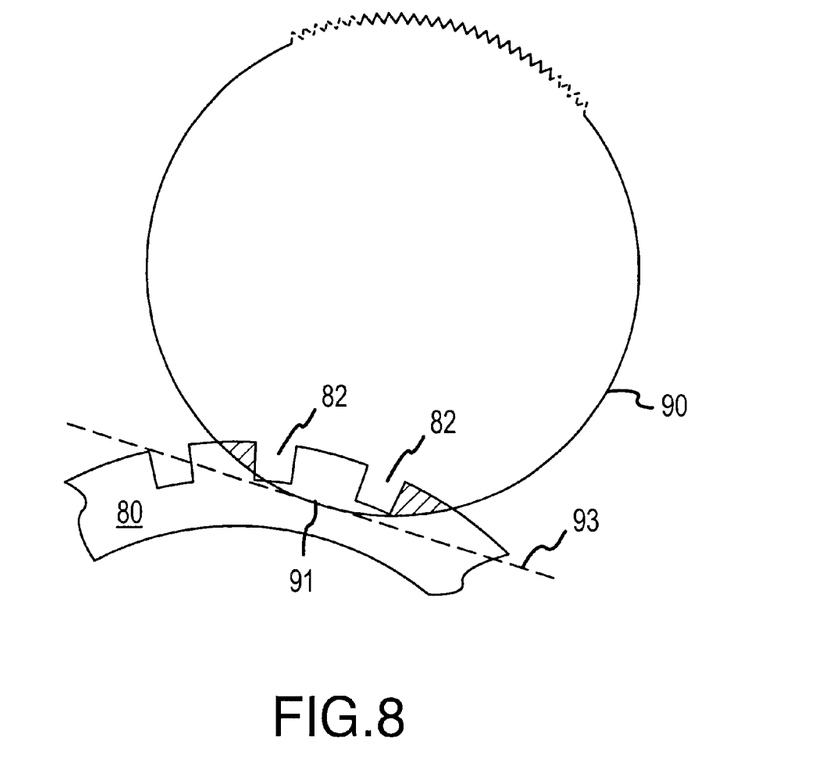
FIG. 8 is a plan view from within a machined helical groove in a rotor blank indicating the path of a saw cutting operation.

Referring now to FIG. 8, in an alternative manufacturing technique, a high speed "slitting" saw blade 90 is used rather than the single point tool. The slitting saw can be used in the same manner as described above for the single point tool, by cutting helical grooves 80, and then annular channels 82 to define the rotor blades 50. In a preferred method however, the slitting saw or a single point tool is first used to form the annular channels 82. The slitting saw is used to cut the working surfaces of individual rotor blades by orienting the slitting saw at a desired blade angle $\alpha$ and plunging the saw radially into the rotor blank to the depth of a rotor blade 50, and then raising the saw radially out of the rotor blank. The above individual blade cutting step is repeated for each blade on each of the blade rows. As can be seen in FIG. 9, because of the size of the saw blade 90, each individual saw cut is wider than the blade being cut and the adjacent annular grooves 82, and in fact overruns into the adjacent blade rows. Consequently, the dimensioning of rotor blades 50 must be such that the saw blade only cuts into sacrificial material between blades of the adjacent upstream and downstream blade rows, and not the rotor blades themselves.

A slitting saw process of this type can be conveniently performed on a multi-axis milling machine having a rotary table. An advantage of such a method is that the blade angle $\alpha$ can be easily adjusted as desired from one blade row to the next. Also, the high speed rotating saw can cut much faster than a single point tool operation in which cutting speed is limited to the rotation speed of the workpiece.

In another alternative manufacturing method, a long straight wire EDM is used instead of the slitting saw to cut the individual blades. As with the slitting saw method, the wire EDM cut also overruns axially the ends of the rotor blade being formed, and thus must be calculated to fall in the space between blades of the adjacent blade rows. A typical cutting path of a wire EDM is indicated by dotted line 93 in FIG. 8.

A turbomolecular pump according to the present invention is considerably smaller, lighter, and operates at a considerably higher rotational speed than known pumps. In a preferred embodiment, the maximum diameter of the rotor 6 is between approximately 1 and 2 inches, preferably about 1.5 inches; and the length of the rotor 6 is between about 1 inch and 2 inches, and preferably about 1.5 inches. Because of the small size, the total weight of such a turbomolecular pump is less than 200 grams, and preferably less than 150 grams. To produce an approximate range of volumetric flow rates of pumped gas of between 1 and 10 liters per second, the rotational velocity of the rotor is preferably between about 120,000 and 200,000 RPM. At these high speeds, power consumption is nevertheless much lower than in prior art turbomolecular pumps because of the design features discussed above, including the rotor loading bias favoring the non-contacting bearing. The power consumption of a pump in accordance with the present invention operating at the above described speeds and pumping rates is between approximately 2 watts and 7 watts, and preferably about 4 watts.

What is claimed is:

1. A method of machining the rotor blades of a high speed vacuum pump rotor, comprising the steps of:

providing an axisymmetric rotor blank having an outer surface;

machining a plurality of closely spaced helical grooves in the outer surface of the rotor blank extending along a desired pitch angle, the walls of the helical grooves defining the working surfaces of the rotor blades;

machining a plurality of adjacent annular grooves in the outer surface intersecting the helical grooves, the annular grooves separating the rotor blades into distinct rows and defining the leading and trailing edges of the rotor blades.

2. The method of claim 1, wherein the steps of machining the helical grooves and machining the annular grooves are performed in a lathe operation, using a single point cutting tool for each step.

3. The method of claim 2, wherein the step of machining the helical grooves is performed first, and the step of machining the annular grooves is performed second.

4. The method of claim 1, wherein the outer surface profile of the rotor blank is conical.

5. The method of claim 1, further comprising the step of varying the pitch angle of the helical grooves along the axial length of the rotor.

6. A method of machining the rotor blades of a high speed vacuum pump rotor, comprising the steps of:

providing an axisymmetric rotor blank having an outer surface;

machining a plurality of adjacent annular grooves in the outer surface;

cutting a plurality of angled regularly spaced slits into the rotor blank material between annular grooves, the slits defining the working surfaces of the rotor blades, and the annular grooves separating the rotor blades into distinct rows.

7. The method of claim 6, wherein the cutting step is performed using a high-speed rotary saw blade.

8. The method of claim 7, wherein the cutting step is performed by plunging the saw blade radially into the rotor blank to the depth of a rotor blade.

9. The method of claim 6, wherein the cutting step is performed using a straight wire EDM.

10. The method of claim 6, further comprising the step of changing the angle of the slits on at least one row of blades is changed.

11. The method of claim 6, wherein the slits formed in the cutting step extend into the immediately adjacent blade rows upstream and downstream of the blade row being cut.

* * * * *